US010508766B2

(12) United States Patent  
Gebril et al.

(10) Patent No.: US 10,508,766 B2  
(45) Date of Patent: Dec. 17, 2019

(54) WALL MOUNTED SLIDING MOUNT FOR SMALL DEVICES

(71) Applicant: Middle Atlantic Products, Inc., Fairfield, NJ (US)

(72) Inventors: Mohamed Gebril, Franklin Lakes, NJ (US); Robert Alosio, Parsippany, NJ (US); Artur D. Harris, Jr., Ocean Grove, NJ (US)

(73) Assignee: Legrand AV Inc., Fairfield, NJ (US)

( * ) Notice: Subject to any disclaimer, the term of this patent is extended or adjusted under 35 U.S.C. 154(b) by 58 days.

(21) Appl. No.: 16/001,700

(22) Filed: Jun. 6, 2018

(65) Prior Publication Data

US 2018/0352956 A1   Dec. 13, 2018

Related U.S. Application Data

(60) Provisional application No. 62/517,583, filed on Jun. 9, 2017.

(51) Int. Cl.
*F16M 13/02* (2006.01)
*A47B 97/00* (2006.01)
(Continued)

(52) U.S. Cl.
CPC ......... *F16M 13/022* (2013.01); *A47B 97/001* (2013.01); *F16B 5/0642* (2013.01); *F16B 5/0664* (2013.01); *F16M 11/045* (2013.01); *F16M 13/02* (2013.01); *A47B 21/04* (2013.01); *A47B 2220/0022* (2013.01); *F16B 5/0628* (2013.01); *F16B 5/121* (2013.01)

(58) Field of Classification Search
CPC .... F16M 13/02; F16M 13/022; F16M 11/045; F16M 11/2085; F16B 5/0664; A47B 97/001; H04N 5/655
See application file for complete search history.

(56) References Cited

U.S. PATENT DOCUMENTS 5,227,582 A * 7/1993 Velasco ................. H04N 5/655  
174/372  
D609,030 S * 2/2010 Barabas ...................... D14/238  
(Continued)

OTHER PUBLICATIONS

International Search Report and Written Opinion dated Sep. 7, 2018 (corresponding International Appl. No. PCT/US18/36495).

*Primary Examiner* — Eret C McNichols  
(74) *Attorney, Agent, or Firm* — Drinker Biddle & Reath LLP (57) ABSTRACT

A slide mount assembly for attachment to a wall or other structure in a location behind a mounted display and for mounting of electronics equipment. The slide mount assembly includes a base frame configured to attach to a structure and frame having a mounting flange with holes for use in securing the base frame to the structure. A slide frame is slidably attached to the base frame by at least one slide assembly. The slide frame includes flanges that are attached to a slide frame plate, each flange having a plurality of spaced apart apertures. A mounting plate is attached to the slide frame and has a planar portion. At least one mounting tab is formed on and extends outward from the upper and lower edges of the mounting plate. Each mounting tab is configured to engage with one of the mounting apertures on the slide frame.

15 Claims, 8 Drawing Sheets

(51) Int. Cl.
*F16B 5/06* (2006.01)
*F16M 11/04* (2006.01)
*A47B 21/04* (2006.01)
*F16B 5/12* (2006.01)

(56) References Cited

U.S. PATENT DOCUMENTS

| | | | |
|---|---|---|---|
| 7,963,489 B2 | 6/2011 | O'Keene et al. | |
| 8,282,058 B2 * | 10/2012 | Lundrigan | F16M 11/046 248/220.22 |
| D695,748 S * | 12/2013 | Morris | D14/447 |
| D702,826 S | 4/2014 | Schluter et al. | |
| 8,939,417 B1 * | 1/2015 | Wengreen | F16M 11/041 248/205.3 |
| 9,057,478 B2 | 6/2015 | Chen | F16M 13/02 |
| 9,131,622 B2 | 9/2015 | Schluter et al. | |
| 9,265,346 B1 * | 2/2016 | Forney | A47B 97/001 |
| D759,005 S * | 6/2016 | Murakami | D14/251 |
| 2005/0191611 A1* | 9/2005 | Owen | A47B 97/001 434/408 |
| 2007/0051861 A1 | 3/2007 | Teramachi et al. | |
| 2008/0029669 A1* | 2/2008 | Olah | B60R 11/0229 248/276.1 |
| 2010/0033943 A1* | 2/2010 | Tsai | F16M 13/02 361/829 |
| 2010/0288895 A1* | 11/2010 | Shamie | F16M 11/041 248/222.14 |
| 2011/0011993 A1* | 1/2011 | Cheng | F16M 13/02 248/205.1 |
| 2011/0042541 A1* | 2/2011 | Spencer | A47B 97/001 248/447.1 |
| 2011/0198460 A1* | 8/2011 | Stifal | F16M 11/10 248/201 |
| 2012/0104205 A1* | 5/2012 | Sculler | H05K 5/0017 248/291.1 |
| 2012/0305511 A1 | 12/2012 | Schluter et al. | |
| 2013/0069507 A1* | 3/2013 | Dowling | F16M 11/10 312/236 |
| 2013/0092805 A1* | 4/2013 | Funk | F16M 13/02 248/121 |
| 2013/0187019 A1* | 7/2013 | Dittmer | F16M 11/10 248/277.1 |
| 2013/0193092 A1 | 8/2013 | Stifal et al. | |
| 2014/0061406 A1* | 3/2014 | Chevalier | F16M 11/08 248/205.1 |
| 2014/0211100 A1* | 7/2014 | Massey | H04N 5/655 348/836 |
| 2016/0007735 A1* | 1/2016 | Gallup | A44B 11/2592 248/447.1 |
| 2016/0018054 A1* | 1/2016 | Simon | F16M 11/10 248/222.11 |
| 2016/0058183 A1* | 3/2016 | Kuan | F16M 1/00 211/26 |
| 2016/0120295 A1* | 5/2016 | Rowley | A45F 5/00 248/346.06 |
| 2016/0234955 A1* | 8/2016 | Wengreen | G06F 1/1607 |
| 2016/0245457 A1* | 8/2016 | Skull | G06F 1/16 |
| 2016/0290553 A1 | 10/2016 | Helmikkala | |
| 2017/0065077 A1* | 3/2017 | Behroozi | A47B 23/043 |
| 2017/0150620 A1* | 5/2017 | Wengreen | H05K 5/0204 |
| 2017/0208945 A1* | 7/2017 | Wengreen | F16M 13/02 |
| 2017/0295933 A1* | 10/2017 | Sculler | F16M 13/02 |
| 2017/0350554 A1* | 12/2017 | Stifal | F16M 11/10 |
| 2019/0226635 A1* | 7/2019 | Sung | F16M 11/04 |
| 2019/0277442 A1* | 9/2019 | Kandibur | F16M 11/2092 |

* cited by examiner

FIG. 4B
CLOSED POSITION

FIG. 4A
EXTENDED POSITION

FIG. 11C

WALL MOUNTED SLIDING MOUNT FOR SMALL DEVICES

RELATED APPLICATION

This application is related to and claims priority from U.S. Provisional Application 62/517,583, filed on Jun. 9, 2017, the disclosure of which is incorporated herein by reference in its entirety.

BACKGROUND

There has been a tremendous growth in the use of wall mounted displays, such as TVs and video monitors, primarily fueled by the development of flat screen displays. More users of wall-mounted displays prefer a clean, aesthetic appearance without the distraction of wiring and audio/visual components. Of course, running wiring in the walls to the location of the display is a known and successful method of hiding the wiring. However, locating associated audio/video and/or computer equipment is more challenging.

One solution is the incorporation of an electronics box in the wall. That solution, however, requires that there be sufficient room between structural supports for adding the box. It also requires additional construction to be undertaken, which is costly and time consuming.

A need exists for providing a mounting system for securing small electronics components in close proximity to a wall mounted display.

SUMMARY OF THE INVENTION

A slide mount assembly is disclosed for attachment to a wall or other structure in a location behind a mounted display. The slide mount assembly providing a location for mounting electronics equipment behind a display. The slide mount assembly includes a base frame configured to attach to a structure and having a mounting flange with holes for use in securing the base frame to the structure. A slide frame is slidably attached to the base frame by at least one slide assembly. The slide frame includes upper and lower flanges which are attached to or formed integral with a slide frame plate. Each flange having a plurality of spaced apart mounting apertures. A mounting plate is attached to the slide frame and has a generally planar portion that includes a plurality of mounting apertures for attachment of electronics and other components. The planar portion has upper and lower edges. At least one mounting tab is formed on and extends outward from each of the upper and lower edges. Each mounting tab is configured to engage with one of the mounting apertures on the slide frame.

Preferably there are four tabs, one located at corner of the mounting plate.

Preferably the mounting plate is removably attached to the slide frame and at least one of tabs includes a disengageable locking mechanism for removably securing the tab to the slide frame. In an embodiment the locking mechanism includes a locking finger that is movable between a first position where the finger protrudes laterally from the tab, and a second position wherein the finger is located substantially under the tab, and wherein in the first position the finger in combination with the tab inhibits removal of the tab from the mounting aperture in the slide frame, and in the second position the finger does not prevent removal of the tab from the mounting aperture in the slide frame. Preferably the locking finger is biased into the first position. A lever may be attached to the locking finger for permitting the locking finger to be moved into the second position.

In an embodiment, the upper and lower flanges of the slide frame are joggled outward from the slide frame plate, with each flange including a first leg and a second leg, the first leg being offset from the slide frame plate and at a right angle to the second leg which is at right angle to the slide frame plate. The mounting apertures are preferably located on the second leg.

Preferably there are two slide assemblies spaced apart from one another, one of the slide assemblies mounted to the upper flange of the slide frame and a top portion of the base frame, and the other of the slide assemblies mounted to the lower flange of the slide frame and a bottom portion of the base frame.

Preferably each slide assembly includes at least a fixed track and a slide rail, the slide rail engaged with and sliding within or upon the fixed track between a retracted position where the slide rail substantially overlies the fixed frame, and an extended position where the slide rail is slid at least partially away from the fixed rail so as to be cantilevered off of the fixed rail. In an embodiment, the slide rail comprises a two piece rail assembly with a first rail sliding on and engaged with the fixed track, and a second rail that slides on and is engaged with the first rail and is attached to the associated flange on the slide frame.

In an embodiment the sliding assembly includes a lip formed on and projecting upward from an upper edge of the base frame and a u-shaped channel on the upper flange of the slide frame with an open end of the channel facing downward. The u-shaped channel sits on the lip so as to permit the slide frame to slide on the base frame.

Preferably stops are attached to the fixed track or the slide rail for limiting the extension and retraction of the slide rail relative to the fixed track.

In an embodiment, a slide mount assembly for attachment to a wall or other structure in a location behind a mounted display is disclosed. The slide mount assembly includes a base frame configured to attach to a structure and having a mounting flange with holes for use in securing the base frame to the structure. A slide frame is slidably attached to the base frame through two slide assemblies spaced apart from one another, one of the slide assemblies being mounted to an upper flange of the slide frame and a top portion of the base frame, and the other of the slide assemblies mounted to a lower flange of the slide frame and a bottom portion of the base frame. The upper and lower flanges are preferably attached to or formed integral with a slide frame plate. The upper and lower flanges each include a first leg and a second leg, the first leg being offset from the slide frame plate and at a right angle to the second leg which is at right angle to the slide frame plate. A plurality of spaced apart mounting apertures are formed in the second leg. A mounting plate is removably attached to the slide frame and has a generally planar portion with a plurality of mounting apertures. The planar portion has upper and lower edges with at least one mounting tab formed on and extending outward from each corner of the mounting plate. Each mounting tab is configured to engage with one of the mounting apertures on the slide frame. At least one of the tabs includes a disengageable locking mechanism for removably securing the tab to the slide frame. The locking mechanism includes a locking finger that is movable between a first position where the finger protrudes laterally from the tab and a second position wherein the finger is located substantially under the tab. The locking finger is preferably biased into the first position where the finger in combination with the tab inhibits removal of the tab from the mounting aperture in the slide frame and wherein in the second position, the finger does not prevent removal of the tab from the mounting aperture in the slide frame. A lever may be attached to the locking finger for permitting the locking finger to be moved into the second position. Each slide assembly may include a fixed track and a slide rail, the slide rail engaged with and sliding within or upon the fixed track between a retracted position where the slide rail substantially overlies the fixed frame, and an extended position where the slide rail is slid at least partially away from the fixed rail so as to be cantilevered off of the fixed rail.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DESCRIPTION OF THE EMBODIMENTS

As used herein, the term "wall" is intended to refer to any supporting structure upon which a monitor or video display is mounted. Similarly, the terms "monitor" and "display" are used interchangeably and are intended to broadly refer to any audio/visual display, including video monitor, flat screen television screens, electronic signs, and computer monitors.

Referring to the drawings, several preferred embodiments of a sliding mount assembly 10 for small devices are shown.

The mount assembly 10 is intended for attachment to a wall W or other structure in a location behind a wall mounted display D, but could also be attached to the display D itself. Generally such displays are mounted in close proximity to the wall, typically about 1.5-5.0 inches from the wall, which is enough spacing for a conventional monitor mount to secure to the rear of the display to the wall. The small amount of spacing limits the ability to mount small components, such as power distribution, surge protection, a/v switches, video extenders, computer components (e.g., mini processors), compact PDUs, network switches, mini amplifiers, set-top boxes, splitters, streaming devices, and wireless routers, or for providing suitable cable management. In conventional systems, such equipment is generally mounted in a remote location from the display, thus requiring the routing of wires which can be costly and an eyesore. In situations where the equipment is mounted behind a display monitor, the display monitor must be removed or tilted/swung outward from the wall to access the equipment, thus requiring use of a more complex and costly monitor mount, which tends to further extend the spacing for the monitor from the wall. Also, in the latter cases, the electronics are typically mounted in wall box that must be cut into the wall, again increasing costs.

The slide mount assembly 10 of the present invention addresses that issue. The slide mount assembly 10 includes a slide frame 14 and a base or fixed frame 20, each of which is discussed in more detail below. A mounting plate 12 is attached to the slide frame 14 and includes mounting apertures 11, preferably arranged in a pattern, for attachment of various components/small devices. The pattern may be a universal mounting pattern sold by Middle Atlantic Products, Inc. and disclosed in U.S. Pat. No. D702,826, the disclosure of which is incorporated herein by reference in its entirety. In the illustrated embodiment, the mounting plate 12 is removably attached to a slide frame 14. In the illustrated embodiment, the slide frame 14 includes upper and lower flanges 16 which are preferably joggled outward from a slide frame plate 18. Each flange includes a first leg $16_A$ and a second leg $16_B$, which is preferably at right angles to the first leg $16_A$ and right angles to the slide frame plate 18. A plurality of spaced apart mounting apertures or slots 19 are formed in the second leg $16_B$.

Figure 6:
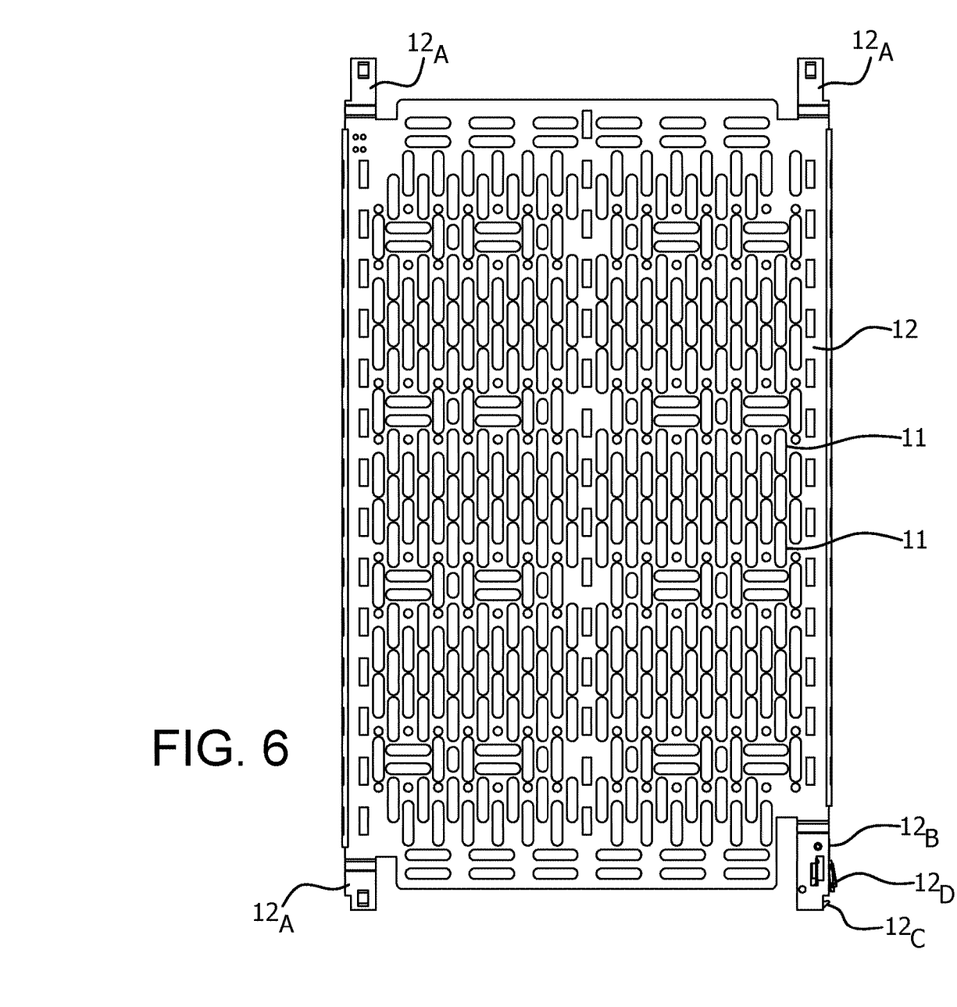
FIG. 6 is a front view of a removable mounting plate that attaches to the sliding mount.
Figure 7:
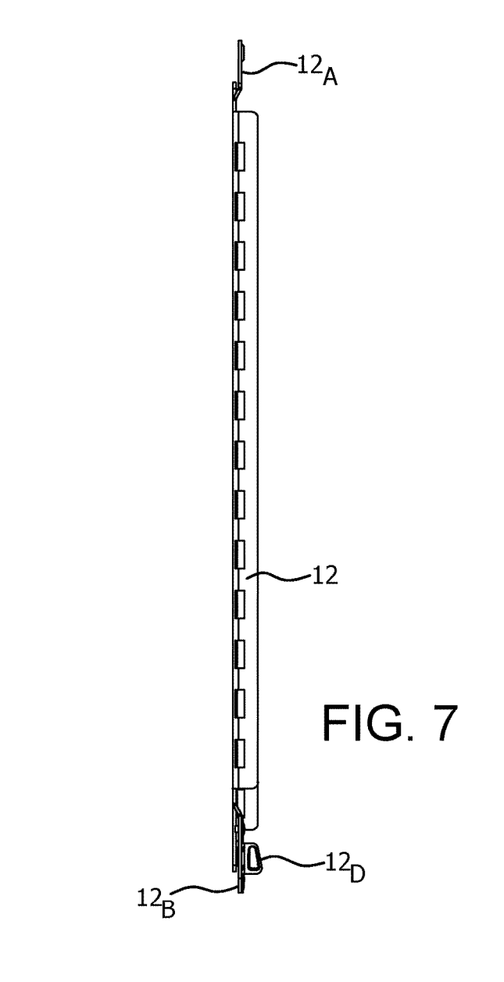
FIG. 7 is a side view of the mounting plate of FIG. 6.

In the illustrated embodiment, the mounting plate 12 includes tabs $12_A$ that are configured to engage with the apertures 19. Preferably there are four tabs $12_A$ located in the corners for the mounting plate (see, FIG. 6). The mounting plate 12 can be attached to the slide frame 14 through any conventional means, including screws that extend through holes in one or more of the mounting tabs. However, in the illustrated embodiment (more clearly shown in FIGS. 6, 7 and 8), the mounting plate 12 preferably includes at least one disengageable locking mechanism for removably securing the mounting plate 12 to the slide frame, thereby permitting ease of access for servicing of the mounted components. In particular, at least one tab $12_B$ on the mounting plate 12 preferably includes a Lever Lock® locking mechanism sold by Middle Atlantic Products, Inc., Fairfield, N.J. and disclosed in U.S. Pat. No. 9,131,622, the disclosure of which is incorporated herein by reference in its entirety. That locking mechanism includes a flexible or spring biased locking finger $12_C$ that is preferably biased to project outward from the side of the tab $12_B$ (first position) thereby defining a tab width that is larger than the width of the mounting aperture in the slide frame. The locking finger $12_C$ is configured to preferably deflect as the tab $12_B$ is inserted into the mounting aperture 19 and springs into place when tab $12_B$ is fully inserted, thereby preventing removal. A lever $12_D$ is attached to the locking finger and configured to move or pivot the finger away from the first position so as to move it to an unlocked (second) position where the finger is substantially behind the tab, thereby allowing the removal of the tab $12_B$ from the slot 19. Other locking mechanisms can be use. The attachment of the mounting plate 12 on the slide frame 14 is intended to locate the surface of the mounting plate 12 as close to the slide frame plate 18 as possible so as to maximize the area for mounting components behind the display D.

Figure 8:
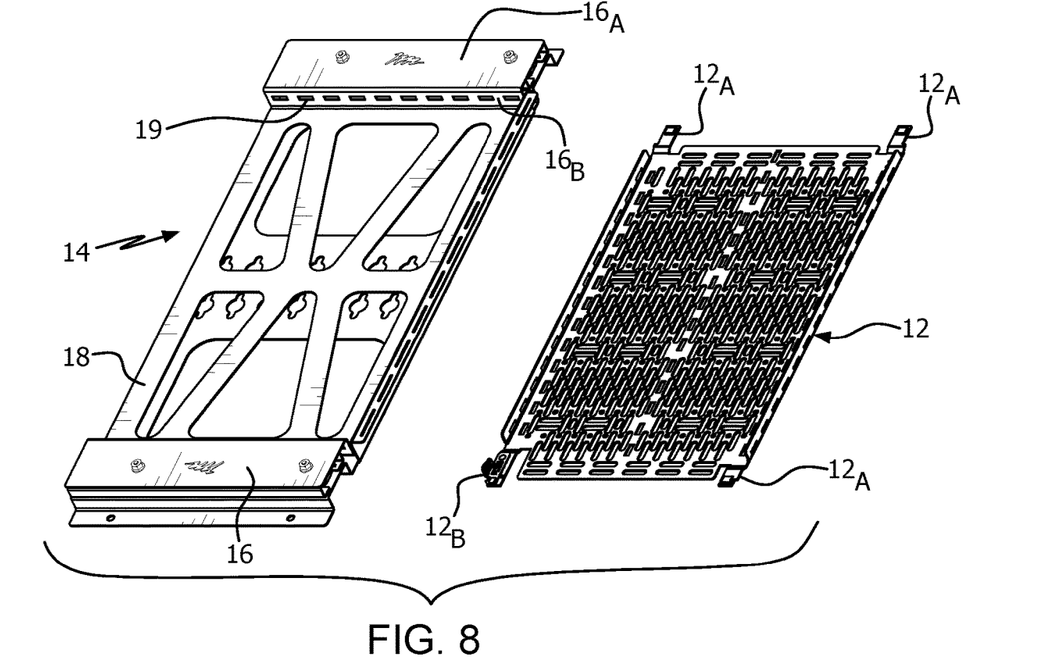
FIG. 8 is an perspective view of a sliding mount according to an embodiment of the invention with a mounting plate shown removed.
Figure 9:
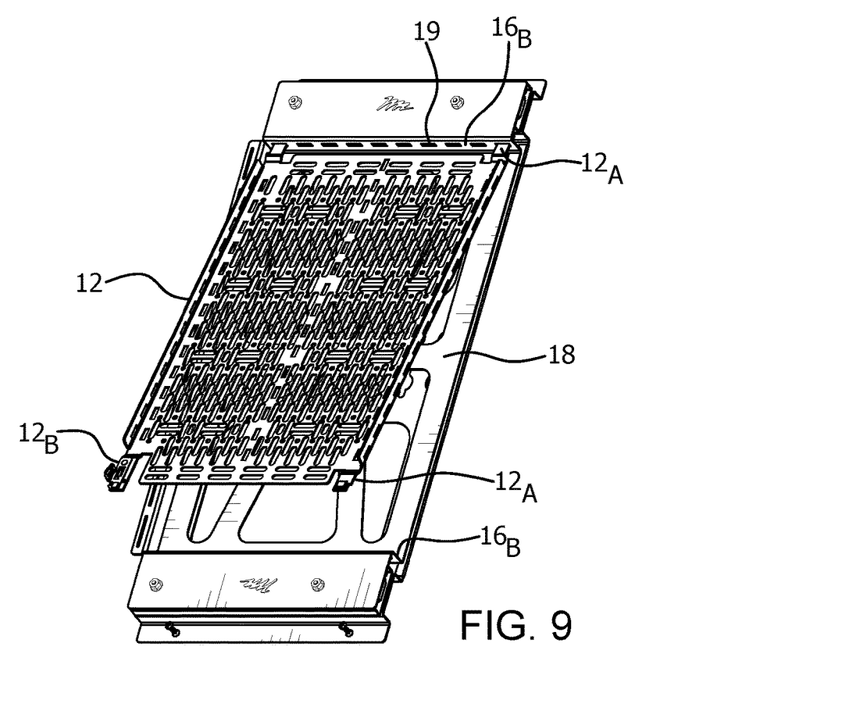
FIG. 9 is an perspective view of the sliding mount of FIG. 8 illustrating the mounting plate in the process of being attached.

FIG. 8 illustrates the mounting plate 12 separated from the slide frame 14, with the slide frame slid onto the base frame 20. FIG. 9 illustrates the attachment of the mounting plate 12 to the slide frame 14. The tabs $12_A$ on one side of the mounting plate 12 are slid completely into the apertures 19 on one of the second legs $16_B$, this provide sufficient clearance for the tabs $12_A$, $12_B$ on the opposite side of the mounting plate 12 to be rotated toward the slide frame plate 18 (as depicted by the arrow). The mounting plate 12 is then slid downward causing the tabs $12_A$, $12_B$ to engage apertures 19 on the other second leg $16_B$.

Figure 1:
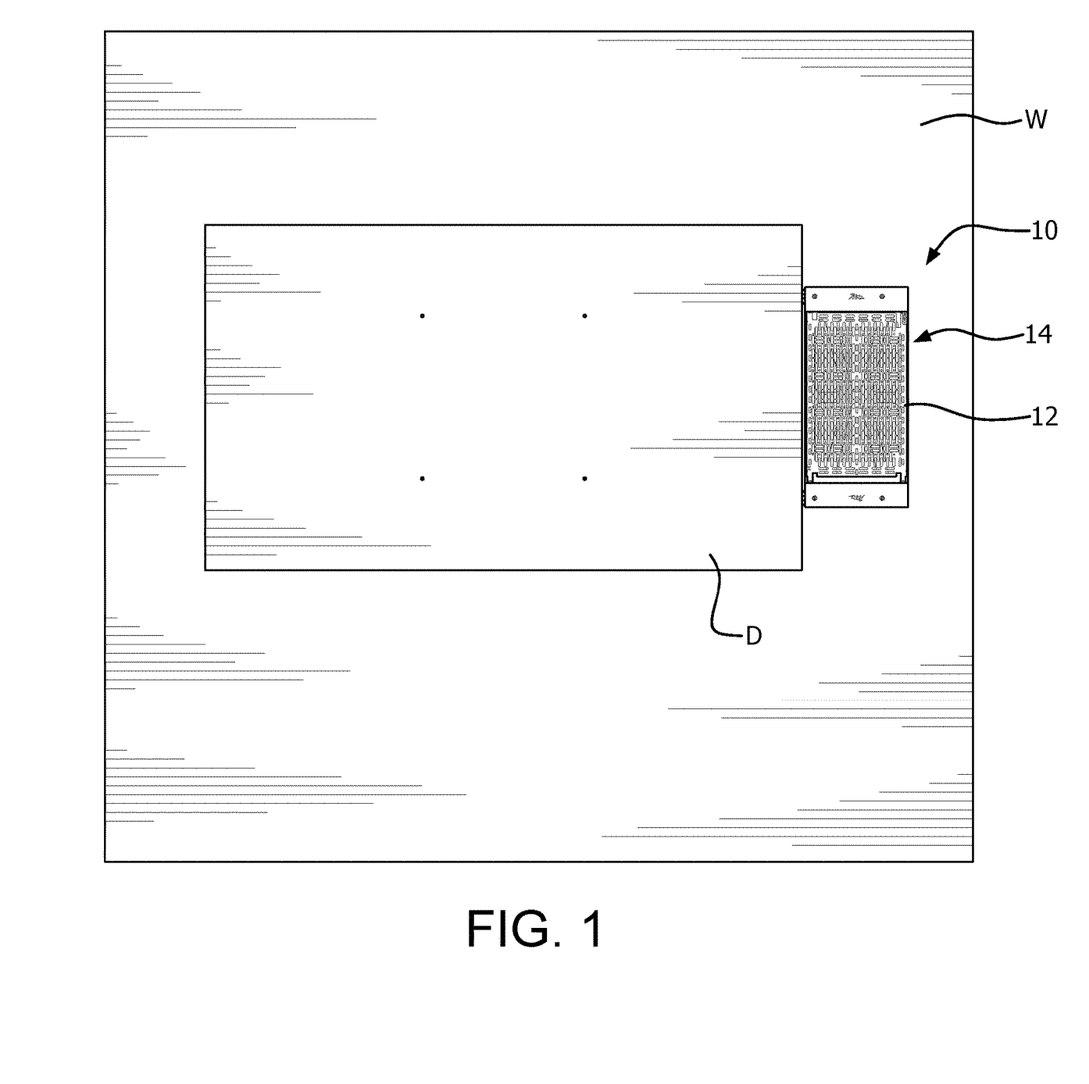
FIG. 1 is a front view of a monitor or display mounted to a wall with a sliding mount attached between the monitor and the wall according to an embodiment of the invention.
Figure 2:
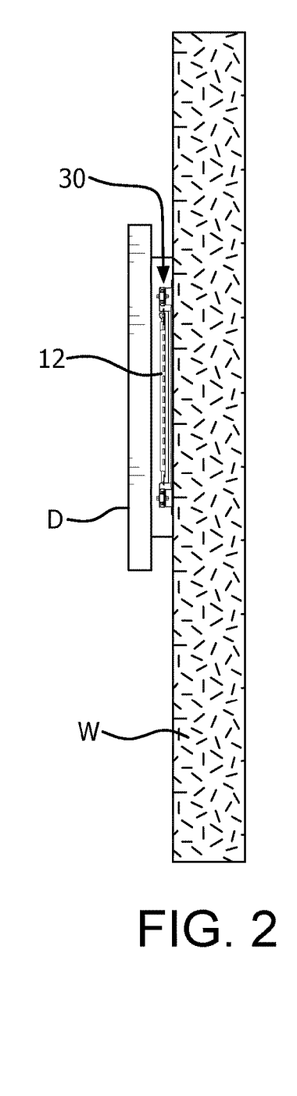
FIG. 2 is a side view of FIG. 1 illustrating the location of the sliding mount between the display and the wall.
Figure 3:
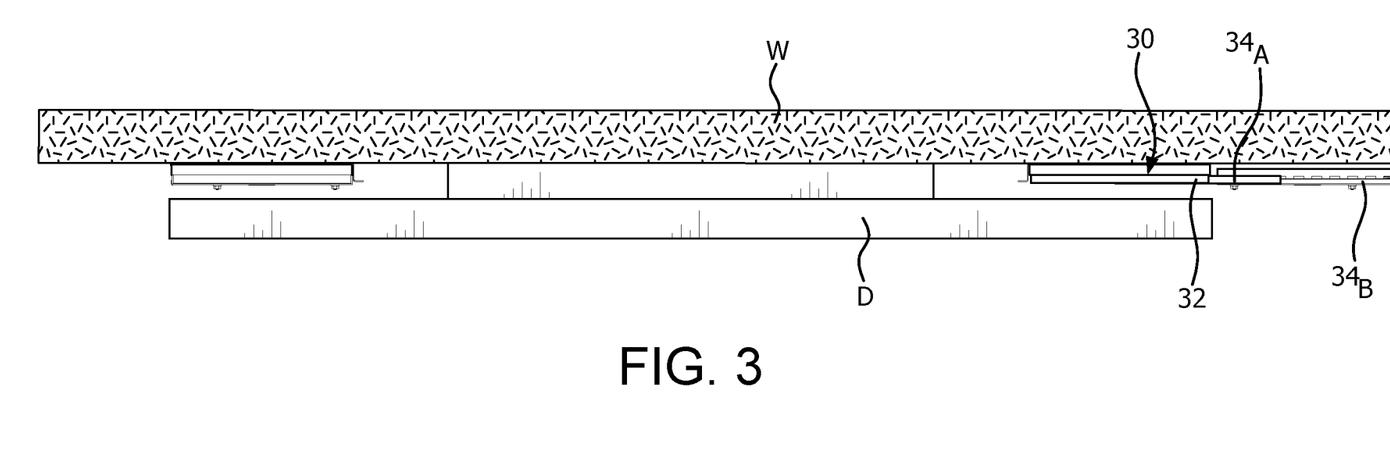
FIG. 3 is a top view of FIG. 1 illustrating the location of the sliding mount between the display and the wall.
Figure 4A:
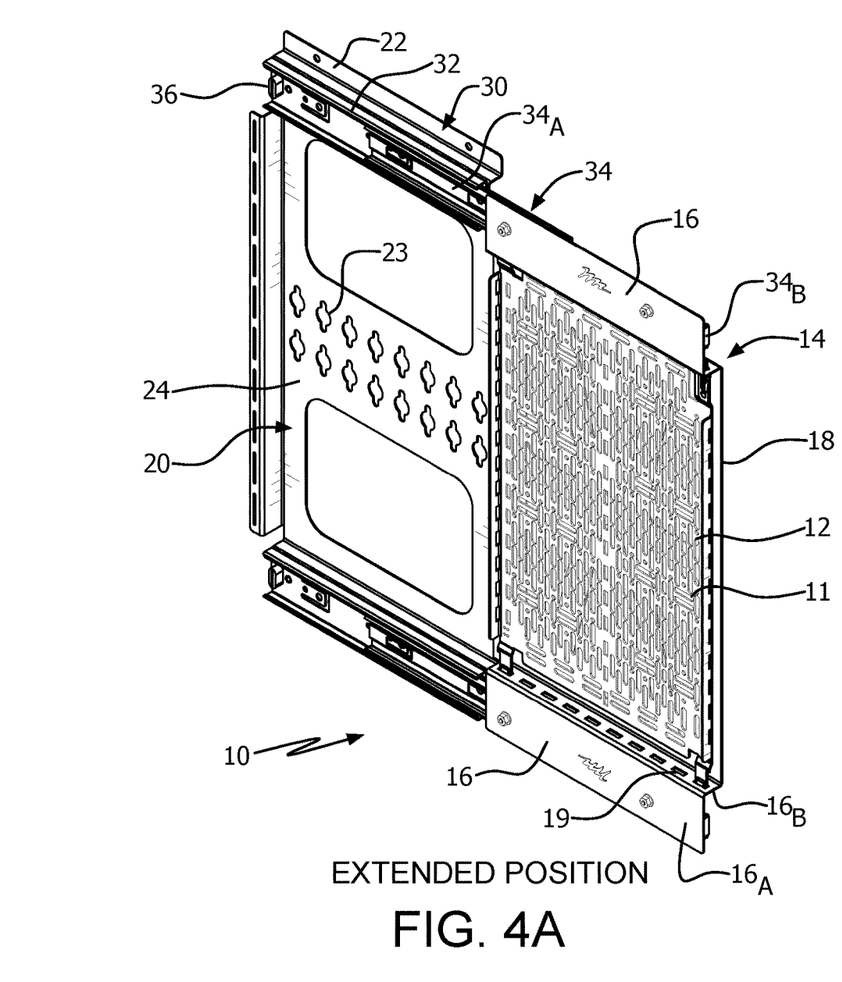
FIG. 4A illustrates one embodiment of the sliding mount in its extended position.
Figure 5:
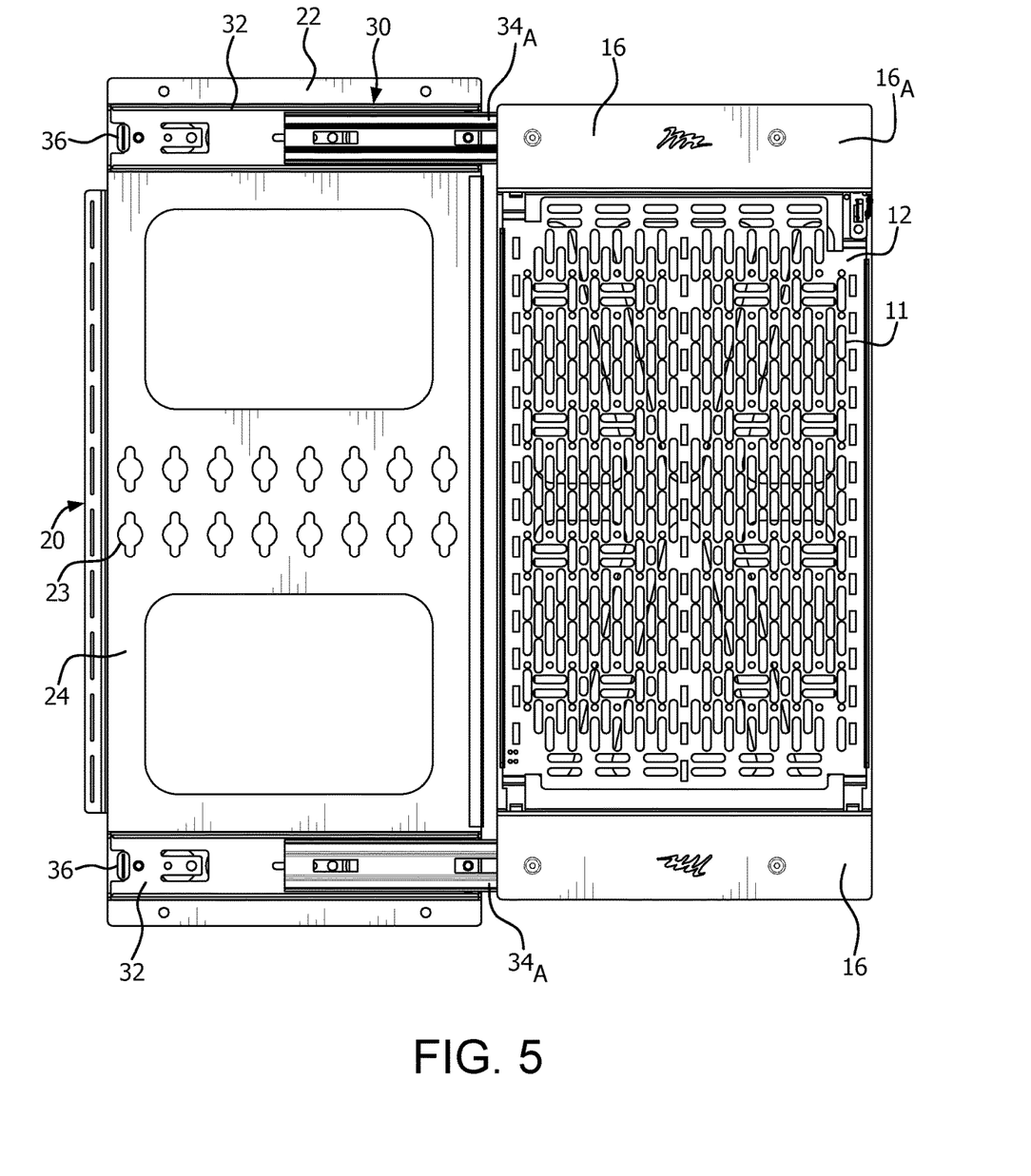
FIG. 5 is a front view of the sliding mount of FIG. 4A in its extended position.
Figure 10:
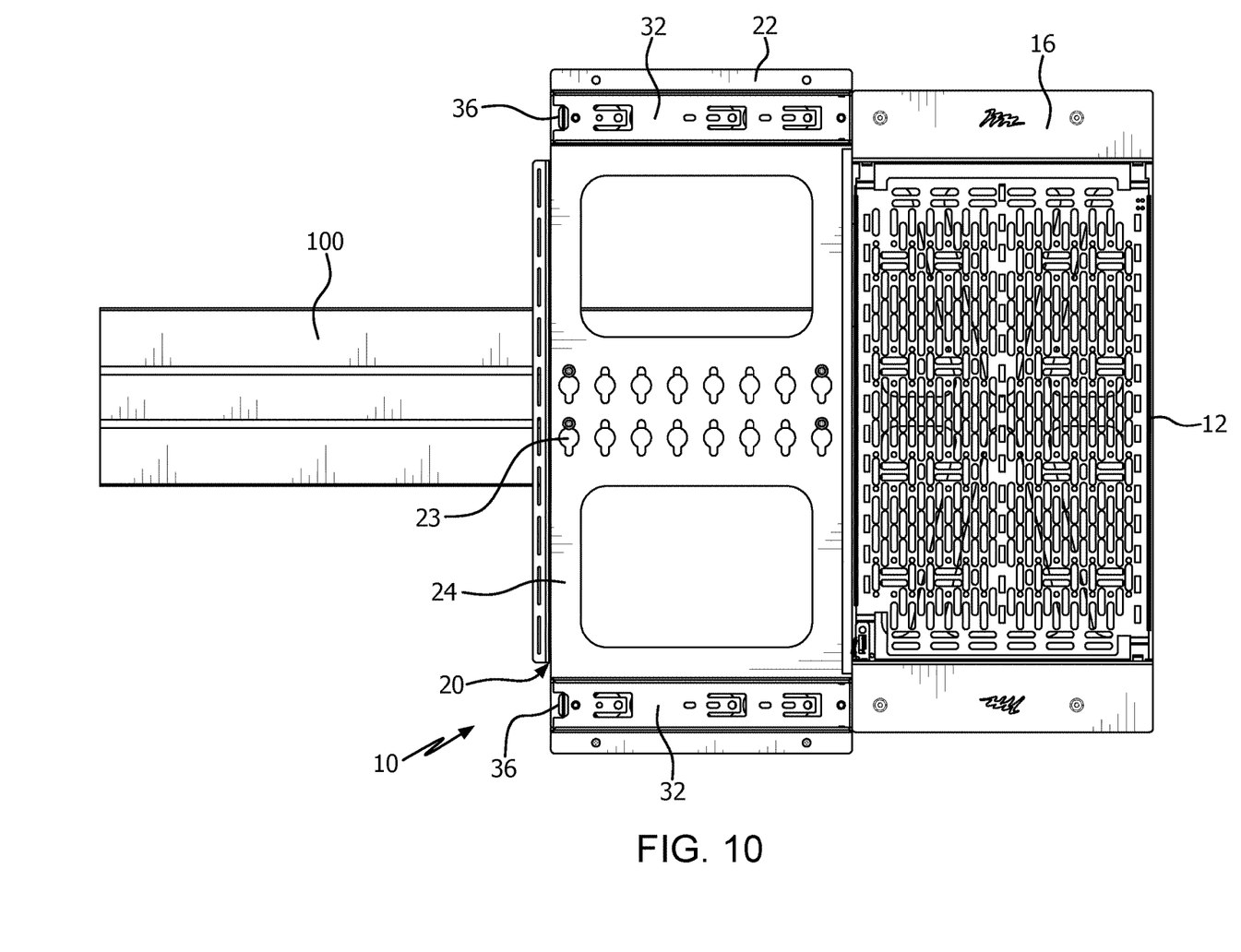
FIG. 10 is a front view of the sliding mount attached to a monitor mounting extrusion which is attached to a wall.

Referring to FIGS. 4A, 5 and 10, the base frame 20 is configured for mounting to the wall W or other structure to which the monitor is mounted, such as a mounting extrusion or frame as discussed below. The base frame 20 may include an upper and/or lower mounting flange 22 that has holes for securing the flange 22 to the wall W. Alternatively or in addition, attachment holes 23 may be located at various places for securing the base frame 20 to a wall or extrusion (see, for example, FIG. 10 which illustrates the slide mount assembly 10 attached to display mount extrusion 100.) The flanges 22 are preferably located on opposite sides of a center support plate 24.

Figure 4B:
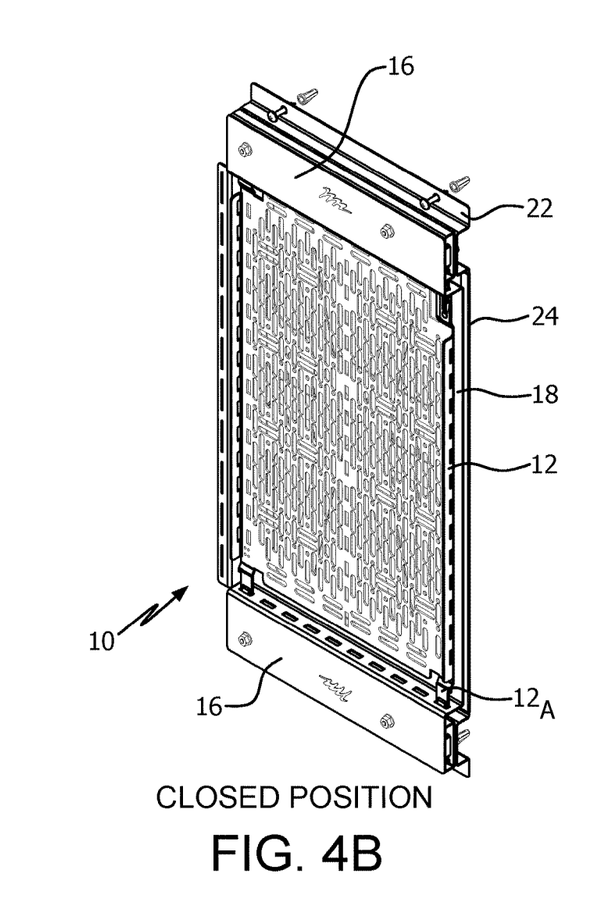
FIG. 4B illustrates the sliding mount of FIG. 4A in its retracted or closed position.

The slide frame 14 is slidably attached to the base frame 20. In one embodiment, the sliding attachment is provided by at least one and more preferably two slide assemblies 30. In an embodiment, each slide assembly 30 includes at least a fixed track 32 and a slide rail 34 that fits into and slides within or on the track 32 between a retracted position (FIG. 4B) and an extended position (FIG. 4A). In the illustrated embodiment, the slide rail 34 is a two piece rail assembly where a first rail $34_A$ acts as a track for a second rail $34_B$ that is nested within and slidable in relation to the first rail $34_A$, thus permitting further extension of the slide frame 14 (and, accordingly, the mounting plate 12) from the base frame 20. The flange 16 of the slide frame 14 is attached to the second rail $34_B$ of the slide rail 34. Stops 36 on the fixed and/or slide rails limit the extension and retraction of the slide rail relative to the fixed track.

Various other mechanisms can be used for providing the sliding attachment of the slide frame 14 to the base frame 20 depending on the anticipated electronic components that are intended to be mounted. For example, the base frame may include a lip formed on and projecting upward from an upper edge of the base frame and the slide frame may include a u-shaped channel on its upper flange with the open end of the channel facing downward. The u-shaped channel sits on the lip so as to permit the slide frame to slide on the base frame.

Figure 11A:
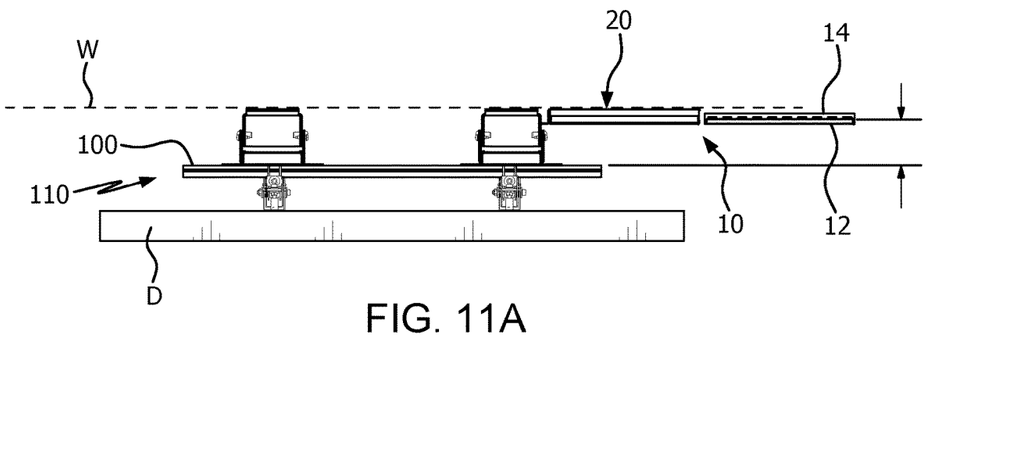
FIGS. 11A-11C illustrate top views of sliding mount in different mounted locations.
Figure 11B:
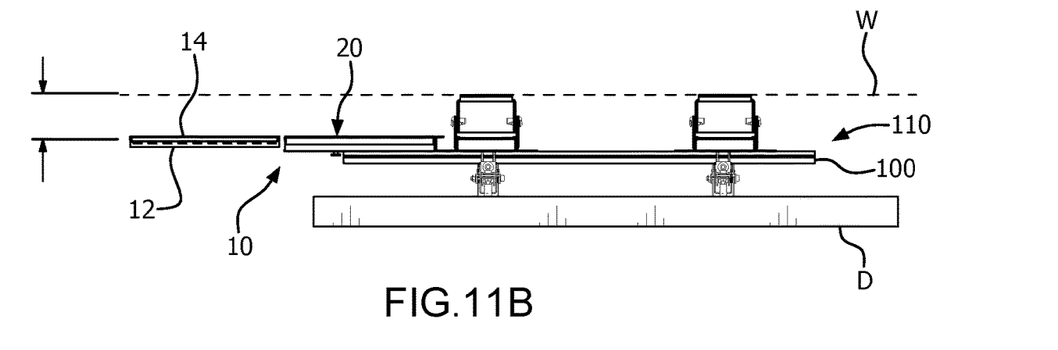
Figure 11C:
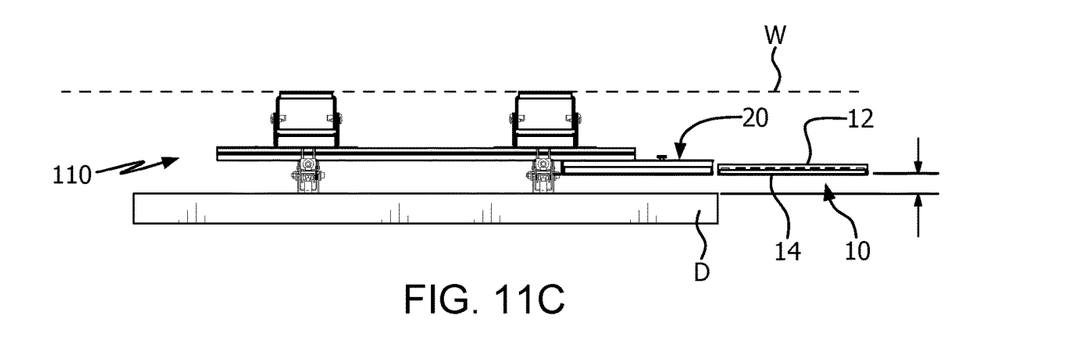

As mentioned above, the fixed frame 20 can be mounted to different structures depending on the intended need. For example, as shown in FIGS. 11A, 11B and 11C, the sliding mount assembly 10 can be mounted directly to a wall W (FIG. 11A), or to the back (FIG. 11B) or front (11C) of an extrusion 100 that is part of a display mount 110. In the illustrated embodiments, depending on the particular display mount 110 and the location of the sliding mount assembly 10, the clearance between the sliding mount assembly and any potentially interfering structure (e.g., wall W or back of the display D), may be between 1.6 to 3.1 inches for mounting components on the sliding mount assembly.

Although the drawings and discussion refer to a side mounted laterally translating sliding mount assembly, it is also contemplated that the sliding mount assembly could be mounted bellow or above a display and move downwards or upwards, respectively. Thus, terms such as "upper" and "lower" as used herein are relative terms and used for convenience. The sliding mount assembly may include a cover or vanity plate to obscure the mounted equipment. The plate may include a keyed lock to prevent removal of the plate and access to the mounted equipment. The sliding mount assembly may be sized to accept 1U and 2U rack rail brackets for attaching larger electronic components. In addition, longer slides can be incorporated so as to permit mounting under a table or desk.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

The invention claimed is:

1. A slide mount assembly for attachment to a wall or other structure in a location behind a mounted display and for mounting of electronics equipment, the slide mount assembly comprising:
   a base frame configured to attach to a structure, the base frame having a mounting flange with holes for use in securing the base frame to the structure;
   a slide frame slidably attached to the base frame, the sliding attachment being provided by at least one slide assembly, the slide frame including upper and lower flanges which are attached to or formed integral with a slide frame plate, each flange having a plurality of spaced apart mounting apertures; and
   a mounting plate attached to the slide frame, the mounting plate having a generally planar portion with a plurality of mounting apertures, the planar portion having upper and lower edges, at least one mounting tab is formed on and extends outward from each of the upper and lower edges of the mounting plate, each mounting tab being configured to engage with one of the mounting apertures on the slide frame.

2. The slide mount assembly according to claim 1, wherein there are four tabs, one located at corner of the mounting plate.

3. The slide mount assembly according to claim 1, wherein the mounting plate is removably attached to the slide frame and wherein at least one of tabs includes a disengageable locking mechanism for removably securing the tab to the slide frame.

4. The slide mount assembly according to claim 3, wherein the locking mechanism includes a locking finger that is movable between a first position where the finger protrudes laterally from the tab and a second position wherein the finger is located substantially under the tab, and wherein in the first position, the finger in combination with the tab inhibits removal of the tab from the mounting aperture in the slide frame and wherein in the second position, the finger does not prevent removal of the tab from the mounting aperture in the slide frame.

5. The slide mount assembly according to claim 4, wherein the locking finger is biased into the first position.

6. The slide mount assembly according to claim 5, further comprising a lever attached to the locking finger for permitting the locking finger to be moved into the second position.

7. The slide mount assembly according to claim 1, wherein the upper and lower flanges of the slide frame are jogged outward from the slide frame plate, with each flange including a first leg and a second leg, the first leg being offset from the slide frame plate and at a right angle to the second leg which is at right angle to the slide frame plate; and wherein the mounting apertures on the flange are formed in the second leg.

8. The slide mount assembly according to claim 1, wherein the slide assembly comprises by two slide assemblies spaced apart from one another, one of the slide assemblies mounted to the upper flange of the slide frame and a top portion of the base frame, and the other of the slide assemblies mounted to the lower flange of the slide frame and a bottom portion of the base frame.

9. The slide mount assembly according to claim 8, wherein each slide assembly includes at least a fixed track and a slide rail, the slide rail engaged with and sliding within or upon the fixed track between a retracted position where the slide rail substantially overlies the fixed frame, and an extended position where the slide rail is slid at least partially away from the fixed rail so as to be cantilevered off of the fixed rail.

10. The slide mount assembly according to claim 9, wherein the slide rail comprises a two piece rail assembly with a first rail sliding on and engaged with the fixed track, and a second rail that slides on and is engaged with the first rail and is attached to the associated flange on the slide frame.

11. The slide mount assembly according to claim 9, further comprising stops attached to the fixed track or the slide rail for limiting the extension and retraction of the slide rail relative to the fixed track.

12. The slide mount assembly according to claim 1, wherein the slide assembly comprises a lip formed on and projecting upward from an upper edge of the base frame and a u-shaped channel on the upper flange of the slide frame with an open end of the channel facing downward, and wherein the u-shaped channel sits on the lip so as to permit the slide frame to slide on the base frame.

13. A slide mount assembly for attachment to a wall or other structure in a location behind a mounted display and for mounting of electronics equipment, the slide mount assembly comprising:
   a base frame configured to attach to a structure, the base frame having a mounting flange with holes for use in securing the base frame to the structure;
   a slide frame slidably attached to the base frame through two slide assemblies spaced apart from one another, one of the slide assemblies being mounted to an upper flange of the slide frame and a top portion of the base frame, and the other of the slide assemblies mounted to a lower flange of the slide frame and a bottom portion of the base frame, the upper and lower flanges being attached to or formed integral with a slide frame plate, the upper and lower flanges each including a first leg and a second leg, the first leg being offset from the slide frame plate and at a right angle to the second leg which is at right angle to the slide frame plate, a plurality of spaced apart mounting apertures formed in the second leg; and
   a mounting plate removably attached to the slide frame, the mounting plate having a generally planar portion with a plurality of mounting apertures, the planar portion having upper and lower edges, at least one mounting tab is formed on and extends outward from each corner of the mounting plate, each mounting tab being configured to engage with one of the mounting apertures on the slide frame, at least one of the tabs including a disengageable locking mechanism for removably securing the tab to the slide frame, the locking mechanism includes a locking finger that is movable between a first position where the finger protrudes laterally from the tab and a second position wherein the finger is located substantially under the tab, the locking finger being biased into the first position where the finger in combination with the tab inhibits removal of the tab from the mounting aperture in the slide frame and wherein in the second position, the finger does not prevent removal of the tab from the mounting aperture in the slide frame.

14. The slide mount assembly according to claim 13, further comprising a lever attached to the locking finger for permitting the locking finger to be moved into the second position.

15. The slide mount assembly according to claim 13, wherein each slide assembly includes at least a fixed track and a slide rail, the slide rail engaged with and sliding within or upon the fixed track between a retracted position where the slide rail substantially overlies the fixed frame, and an extended position where the slide rail is slid at least partially away from the fixed rail so as to be cantilevered off of the fixed rail.

* * * * *